United States Patent
Song (10) Patent No.: US 8,814,252 B2
(45) Date of Patent: Aug. 26, 2014

(54) SIDE SKIRT FOR TRUCK

(71) Applicant: Hyundai Motor Company, Seoul (KR)

(72) Inventor: Won Kyu Song, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/668,718

(22) Filed: Nov. 5, 2012

(65) Prior Publication Data

US 2014/0028055 A1  Jan. 30, 2014

(30) Foreign Application Priority Data

Jul. 27, 2012 (KR) .................. 10-2012-0082279

(51) Int. Cl.
*B62D 35/00* (2006.01)

(52) U.S. Cl.
USPC ........................................ 296/180.2; 293/128

(58) Field of Classification Search
CPC .... B60R 19/565; B60R 19/42; B62D 35/001; B62D 35/008
USPC .......... 296/180.1, 180.2, 180.4, 181.5, 184.1, 296/187.03, 187.12, 193.03, 193.05, 199, 296/148, 1.04; 293/126, 128, 154
See application file for complete search history.

(56) References Cited

U.S. PATENT DOCUMENTS

| | | | |
|---|---|---|---|
| 4,278,284 A * | 7/1981 | Ohlson | 296/36 |
| 4,482,023 A * | 11/1984 | Dziedzic et al. | 180/89.17 |
| 6,257,656 B1 * | 7/2001 | Cook et al. | 296/191 |
| 6,340,191 B1 * | 1/2002 | Brady | 296/37.6 |
| 6,755,460 B1 * | 6/2004 | Marrs et al. | 296/187.12 |
| 7,121,596 B2 * | 10/2006 | Rood | 293/115 |
| 2005/0012344 A1 * | 1/2005 | Sorrells et al. | 292/169 |
| 2011/0089716 A1 * | 4/2011 | Hall | 296/180.2 |
| 2011/0121612 A1 * | 5/2011 | Plett et al. | 296/193.03 |

FOREIGN PATENT DOCUMENTS

| | | |
|---|---|---|
| JP | 2000-318569 A | 11/2000 |
| KR | 10-0316070 B1 | 12/2001 |
| KR | 10-0387781 B1 | 6/2003 |
| KR | 10-0456939 B1 | 11/2004 |

* cited by examiner

*Primary Examiner* — Jason S Morrow
*Assistant Examiner* — E Turner Hicks
(74) *Attorney, Agent, or Firm* — Morgan, Lewis & Bockius LLP (57) ABSTRACT

A side skirt mounting apparatus may include a side skirt that may be installed to be supported by a one-touch locker in an upper portion thereof and a hinge in a lower portion thereof, wherein the locker includes an upper bracket, a lower bracket, a skirt frame to which the upper bracket and the lower bracket may be engaged, a shaft installed to slidably penetrate the upper and lower brackets and to be selectively inserted into a hole formed to a side skirt bracket, and an elastic member mounted on an outer circumference of the shaft between the upper and lower brackets to elastically support the shaft.

8 Claims, 6 Drawing Sheets

SIDE SKIRT FOR TRUCK

CROSS-REFERENCE TO RELATED APPLICATION

The present application claims priority to Korean Patent Application No. 10-2012-0082279 filed on Jul. 27, 2012, the entire contents of which is incorporated herein for all purposes by this reference.

BACKGROUND OF THE INVENTION

1. Field of the Invention

The present invention relates to a side skirt for a truck, and more particularly, to a side skirt installed for protection of various types of tanks installed under a body of a truck.

2. Description of Related Art

Various types of tanks including fuel tanks and air tanks are generally installed under a body of a truck, and as a means for protecting the tanks, a side skirt is provided in the truck. For example, the fuel tank of the truck requires body strength enough to retain an internal fuel and tolerate an external force generated in the case of a collision, etc., and also enables to prevent the fuel tank from damage by an external factor such as deformation of the body in the case of a vehicle collision to minimize damage caused therefrom.

To meet the needs, a side skirt (substantially, the side skirt and a rail assembly) in the shape of a predetermined plate is installed in a body frame side of the truck to protect the tanks from outside influences.

Moreover, to reduce gas emission from a diesel vehicle, an auxiliary fuel such as urea has been widely used recently and accordingly a tank for storing urea in the truck has been protected using the side skirt.

An example of a conventional side skirt discloses a slide-type side skirt which is disposed to arrange from a lower end of a side of a body to a position of wheel to prevent a pedestrian or the like from being caught under a body frame.

Figure 1:
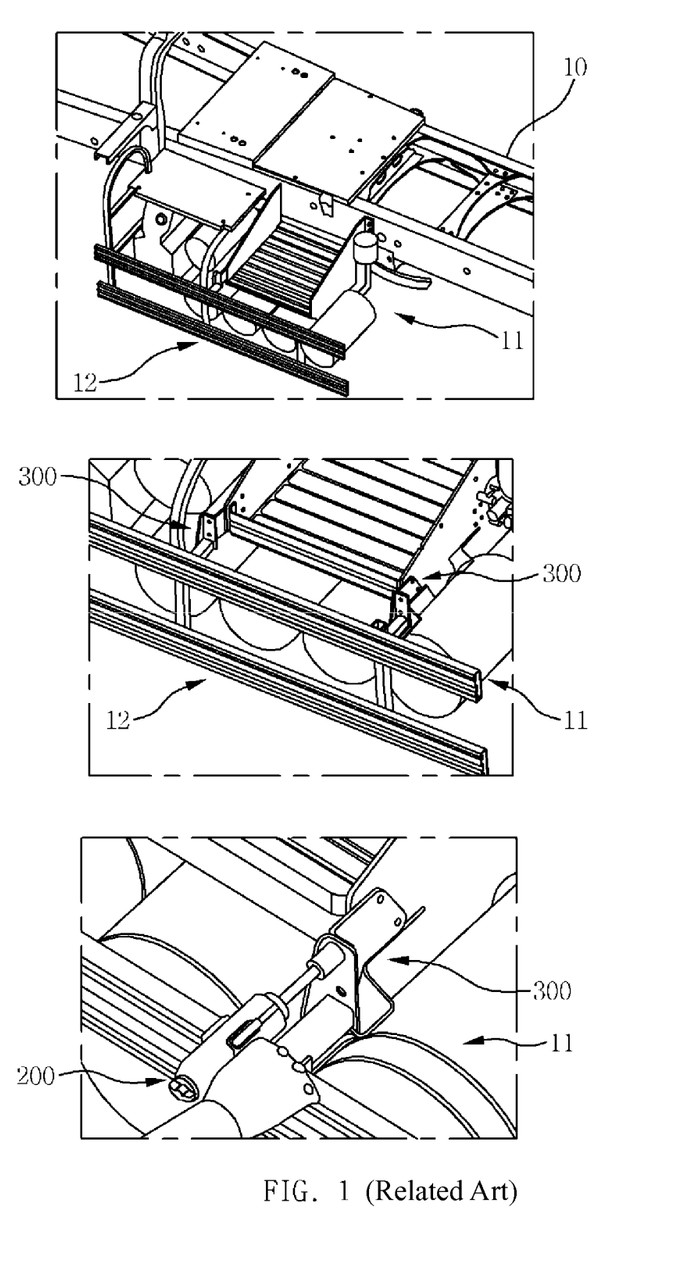
FIG. 1 is a schematic diagram showing a conventional ladder & guard rail assembly for a truck.

Generally, in the case of large trucks, in fuel injection for a tractor, an auxiliary fuel, urea, is also injected, and to secure entry of an injection gun, a side skirt has to be removed, causing use of tools and increasing time for maintenance. For example, as shown in FIG. 1, a tank assembly 11 including an air tank, a fuel tank, a urea tank, or the like is installed in a side of a body frame 10, and a ladder & guard rail assembly 12 serving as a side skirt is installed outwardly from the installed tank assembly 11.

Therefore, to inject urea into the urea tank of the tank assembly 11, front and rear bolt engagement portions 300 of the ladder & guard rail assembly 12 have to be disengaged by using a tool 200, and after injection of urea, the bolt engagement portions 300 have to be fastened by using the tool 200, causing inconvenience due to the use of the tool 200 and increasing time for maintenance.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a side skirt for a truck, in which a new installation scheme for a side skirt is implemented by installing the side skirt for protection of various tanks installed in a body frame by using a one-touch locker of an upper portion and a hinge structure of a lower portion, thereby making it easy to remove the side skirt, resulting in operation time related to fuel injection and facilitating maintenance.

In an aspect of the present invention, a side skirt mounting apparatus may include a side skirt for a truck installed on a side of a body frame to protect a tank assembly, wherein the side skirt is installed to be supported by a one-touch locker in an upper portion thereof and a hinge in a lower portion thereof, wherein the locker may include an upper bracket, a lower bracket, a skirt frame to which the upper bracket and the lower bracket are engaged, a shaft installed to slidably penetrate the upper and lower brackets and to be selectively inserted into a hole formed to a side skirt bracket, and an elastic member mounted on an outer circumference of the shaft between the upper and lower brackets to elastically support the shaft, and wherein the side skirt is removed from or mounted to the side skirt bracket by rotation around the hinge disposed at the lower portion of the side skirt after an upper portion of the side skirt is released from or engaged to the side skirt bracket by a vertical movement of the shaft.

The locker may further include a stopper formed at the shaft above the upper bracket and stopped downwardly on a stopper bar formed on the upper bracket when the stopper is engaged with the stopper bar.

The stopper may include a flat portion.

The stopper is engaged with the stopper bar and the shaft is disengaged from the hole of the side skirt bracket when the stopper is rotated with a predetermined angle such that the flat portion of the stopper is aligned not in parallel to the stopper bar.

The stopper is disengaged with the stopper bar and the shaft is engaged to the hole of the side skirt bracket when the stopper is rotated with a predetermined angle such that the flat portion of the stopper is aligned in parallel to the stopper bar.

The locker may further include a stop ring formed on the shaft between the upper bracket and the lower bracket.

An upper portion of the elastic member is supported on a bottom surface of the upper bracket and a lower portion of the elastic member is supported on a top surface of the stop ring on the shaft, such that the shaft is elastically biased downwardly.

The hinge is an open-type hinge which uses a lock structure between a groove in the skirt frame and a pin in the side skirt bracket.

The hinge is a close-type hinge which uses an engagement structure between a pin hole in the skirt frame and a pin in the side skirt bracket.

The methods and apparatuses of the present invention have other features and advantages which will be apparent from or are set forth in more detail in the accompanying drawings, which are incorporated herein, and the following Detailed Description, which together serve to explain certain principles of the present invention.

Other aspects and preferred embodiments of the invention are discussed infra.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
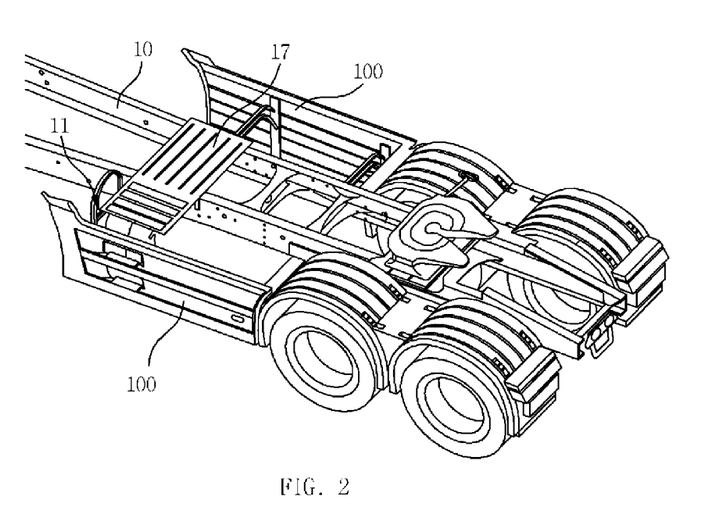
FIG. 2 is a schematic diagram showing an installation state of a side skirt according to an exemplary embodiment of the present invention.

FIG. 2 is a schematic diagram showing an installation state of a side skirt 100 according to an exemplary embodiment of the present invention.

As shown in FIG. 2, the side skirt 100 is a means for protecting a tank assembly 11 installed under a side of a body frame 10 from outside influences, and is installed such that the side skirt 100 is positioned in both side portions of a side skirt bracket 17 installed in the body frame 10 and is supported by a one-touch locker of an upper portion and a hinge of a lower portion.

Here, the locker and the hinge are installed in each of the sides of the side skirt 100 to support the side skirt 100 having a relatively large area in balance.

In FIG. 2, a fuel tank or an air tank is omitted and only a urea tank is shown.

Figure 3:
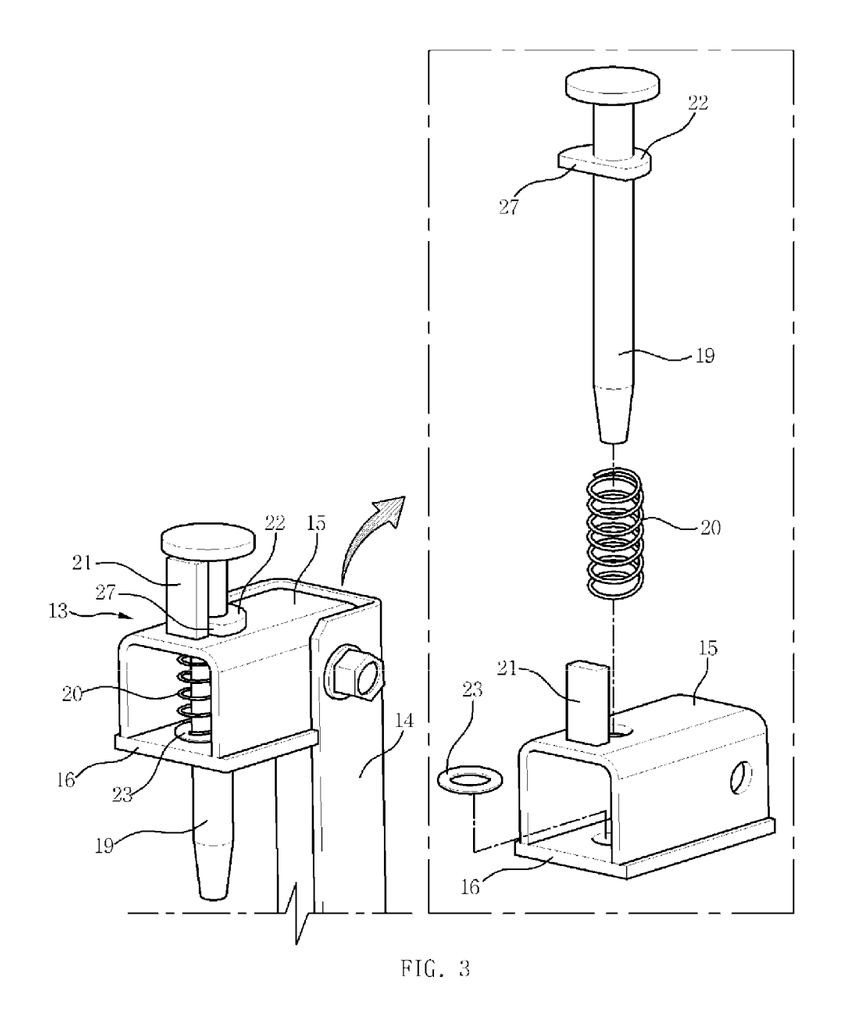
FIG. 3 is a perspective view showing a locker in a side skirt according to an exemplary embodiment of the present invention.

FIG. 3 is a perspective view showing a locker 13 in the side skirt 100 according to an exemplary embodiment of the present invention.

As shown in FIG. 3, the locker 13 can be easily manipulated by a driver's or operator's pull by hand, and is of a one-touch type.

To this end, in a skirt frame 14 standing to a predetermined height on the upper portion of the side skirt 100 are horizontally installed two brackets coupled up and down, that is, an upper bracket 15 having a "⊂"-shape cross-section and a lower bracket 16 in a plate shape, and a shaft 19 having a head portion is installed in the upper and lower brackets 15 and 16 in such a way to vertically penetrate the upper and lower brackets 15 and 16.

The shaft 19 is inserted at a lower portion thereof into a hole 18 formed in the side skirt bracket 17 and is locked therein to fix the upper portion of the side skirt (100) to the side skirt bracket 17.

A spring 20 is positioned in a space formed by the upper and lower brackets 15 and 16, and the spring 20 exerts a force for pulling the shaft 19 downwardly at all times.

In a body of the shaft 19, a stopper 22 in the shape of a circular plate, which has a flat portion 27, and a stop ring 23 in the shape of a ring are concentrically formed up and down with a predetermined interval therebetween, and the stopper 22 may be supported on a top surface of the upper bracket 15 and the stop ring 23 may be supported on a top surface of the lower bracket 16.

The shaft 19 supported by the stopper 22 and the stop ring 23 formed up and down extends toward a bottom surface of the lower bracket 16 by a predetermined length, without moving further downwardly, while being inserted into the upper and lower brackets 15 and 16.

The spring 20, which elastically supports the shaft 19 downwardly at all times, is positioned in the space between the upper bracket 15 and the lower bracket 16, such that an upper end thereof is supported on a bottom surface of the upper bracket 15 and at the same time, a lower end thereof is supported on a top surface of the stop ring 23 on the shaft 19.

Thus, as the shaft 19 is pulled up, the stop ring 23 moves up to compress the spring 20, as the pull of the shaft 19 is released, the shaft 19 moves down by a restoring force of the spring 20.

In particular, the locker 13 includes a stopper 22 as a means for fixing the up position of the shaft 19.

That is, as described above, the stopper 22 is in the shape of a circular plate having the flat portion 27 and is integrally formed on the shaft 19. The shaft 19 in its up position may be locked on an upper end of a stopper bar 21 standing vertically on the top surface of the upper bracket 15.

In an exemplary embodiment of the present invention, the flat portion 27 may be formed in parallel to the stopper bar 21.

As the stopper 22 on the shaft 19 is stopped on the stopper bar 21, downward movement of the shaft 19 is restricted, such that the up position of the shaft 19 can be fixed.

Eventually, according to upward and downward movement of the shaft 19, that is, the up position and down position of the shaft 19, unlocking and locking with the side skirt bracket 17 are made, such that the side skirt 100 can be removed or mounted.

Figure 4:
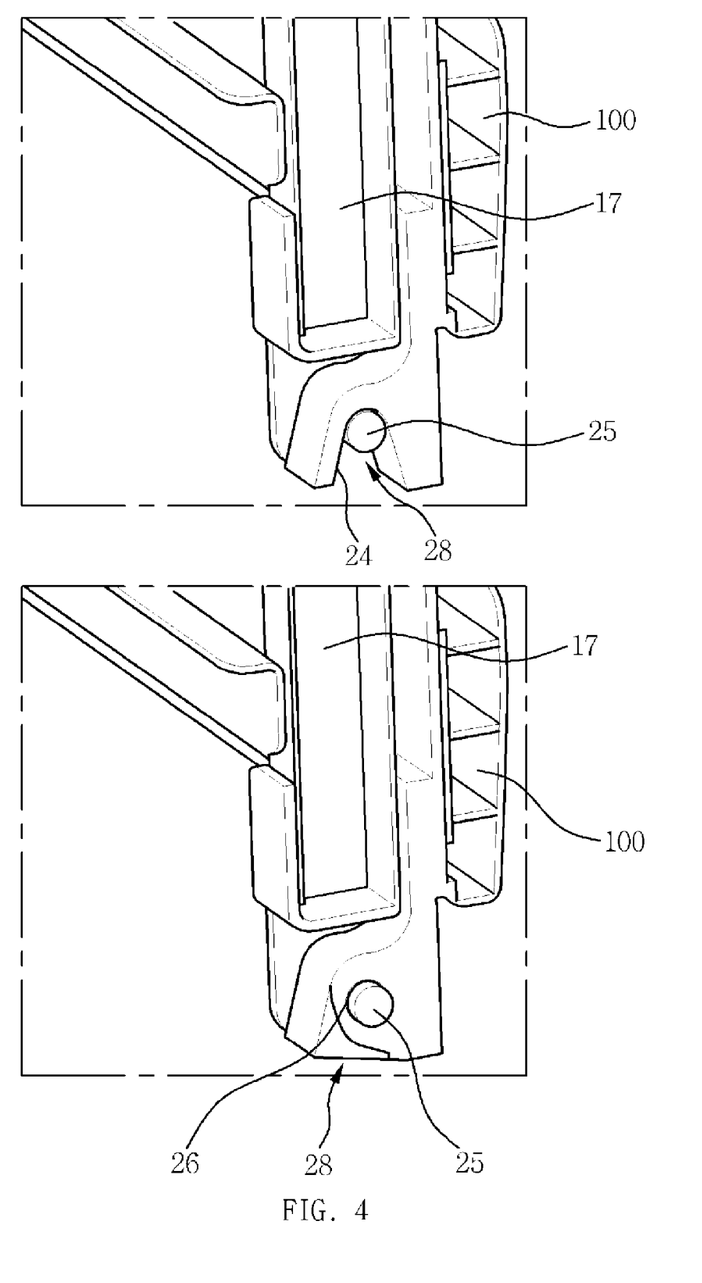
FIG. 4 is a perspective view showing a hinge in a side skirt according to an exemplary embodiment of the present invention.

FIG. 4 is a perspective view showing a hinge 28 in the side skirt 100 according to an exemplary embodiment of the present invention.

As shown in FIG. 4, the hinge 28 is a means for supporting the lower portion of the side skirt 100, and may be an open-type hinge or a close-type hinge.

When the hinge 28 is the open-type hinge, a groove 24 in an approximately "U" shape, which is open downwardly, is formed in the lower portion of the skirt frame 14, such that the hinge 28 has a lock structure in which the groove 24 is rested on a pin 25 in the side skirt bracket 17.

Thus, as the locker in the upper portion is unlocked, the side skirt can be easily removed by being leaned outwardly and lifted up, when the side skirt is mounted, the lower portion of the side skirt can be easily supported by resting the groove 24 in the lower portion of the skirt frame 14 on the pin 25.

When the hinge 28 is the close-type hinge, a pin hole 26 is formed in the lower portion of the skirt frame 14, such that the hinge 28 is engaged with the pin 25 in the skirt bracket 17 through the pin hole 26.

Thus, if the side skirt is leaned outwardly when the locker in the upper portion is unlocked, the side skirt is rotated with respect to the pin-engaged portion in such a way to move away from the side skirt bracket, when the side skirt is stood by being leaned inwardly so as to be mounted, the side skirt is also rotated with respect to the pin-engaged portion in such a way to be supported in adjacent to the side skirt bracket.

Figure 5:
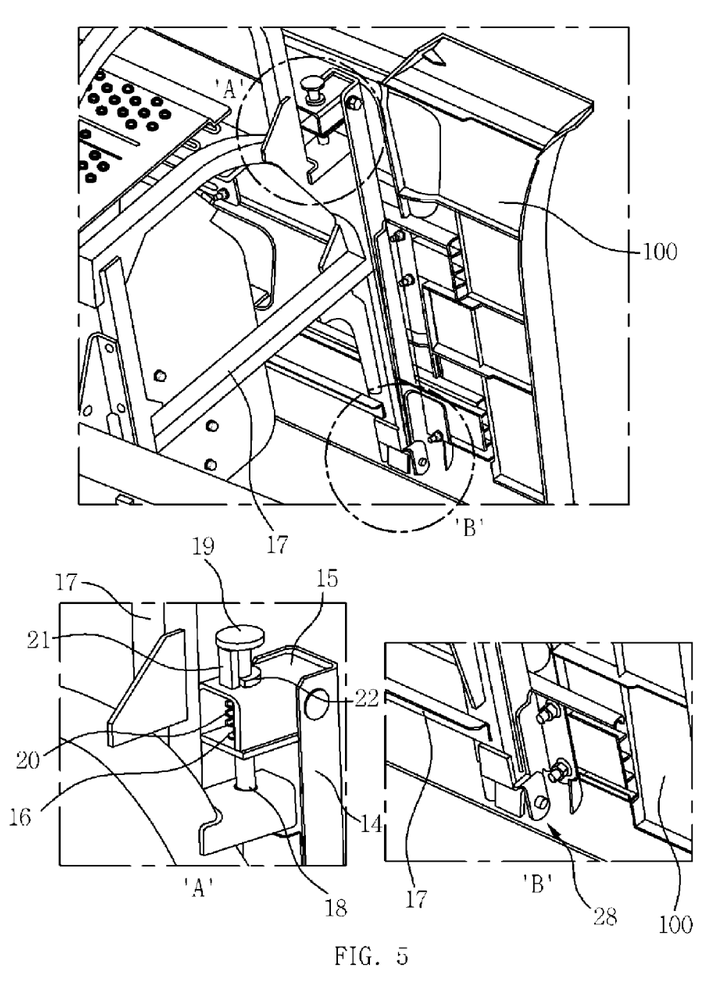
FIG. 5 is a schematic diagram showing an installation state of a locker and a hinge in a side skirt according to an exemplary embodiment of the present invention.

FIG. 5 is a schematic diagram showing an installation state of the locker 13 and the hinge 28 in the side skirt 100 according to an exemplary embodiment of the present invention.

As shown in FIG. 5, the installation state of the locker 13, which is a means for fixing the upper portion of the side skirt, and the hinge 28, which is a means for fixing the lower portion of the side skirt, are shown.

The locker 13 is installed on the upper portion of the skirt frame 14 having a "⊏"-shape cross section installed on an inner side of the side skirt 100, and the hinge 28 is installed on the lower portion of the skirt frame 14.

The hinge 28 is an application example of the close-type hinge.

Therefore, the upper portion of the side skirt 100 is fixed by the locker 13 in both sides, and the lower portion thereof is supported by the hinge 28 in both sides, thereby maintaining a stable installation state.

Figure 6:
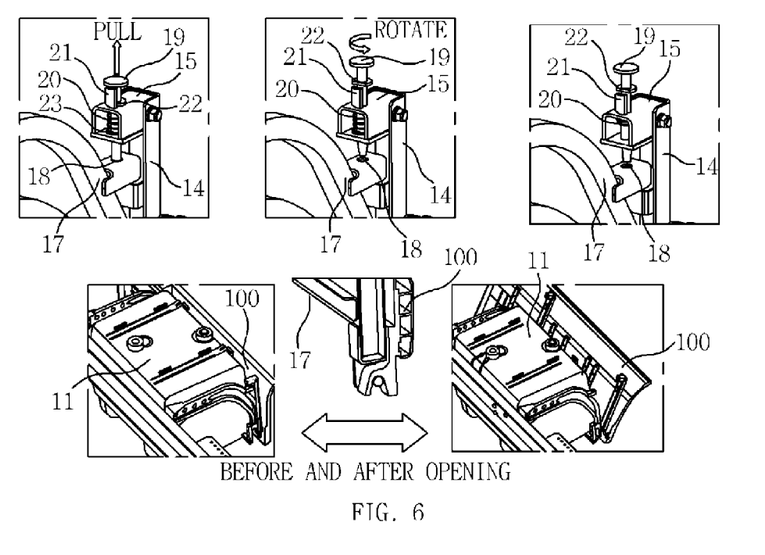
FIG. 6 is a schematic diagram showing a process of removing a side skirt according to an exemplary embodiment of the present invention.

FIG. 6 is a schematic diagram showing a process of removing the side skirt 100 according to an exemplary embodiment of the present invention.

As shown in FIG. 6, by pulling up the shaft 19 while holding a head portion of the shaft 19, the shaft 19 moves up and thus leaves the hole 18 of the side skirt bracket 17.

By rotating the shaft 19 about 180° while continuing pulling up the shaft 19, the stopper 22 on the shaft 19 is positioned on the stopper bar 21 on the upper bracket 15, and in this state, by releasing the pull of the shaft 19, the stopper 22 is placed on the stopper bar 21, such that the shaft 19 is fixed in its up position.

That is, locking between the locker 13 of the side skirt 100 and the side skirt bracket 17 is released.

Next, as the shaft 19 is fixed in its up position, the upper portion of the side skirt 100 is leaned outwardly (from the body), such that the side skirt 100 is rotated with respect to the hinge 28 and thus is leaned by a predetermined angle (in the case of the close-type hinge) or can be completely removed (in the case of the open-type hinge). Therefore, an entry space for an injection gun for auxiliary-fuel injection can be secured, and a space for maintenance or the like may also be secured.

The side skirt 100 can be easily mounted in the reverse order of the mounting.

As such, the present invention adopts the one-touch locker, which can be easily removed and mounted by single manipulation, and the hinge structure, thereby shortening an operation time and improving driver convenience as well as providing convenience in fuel injection and vehicle maintenance.

The side skirt for a truck according to an exemplary embodiment of the present invention has the following advantages:

first, the side skirt can be easily removed and mounted in a one-touch manner, thus providing convenience in fuel injection and vehicle maintenance, second, by employing a one-touch removal structure, a time for injecting an auxiliary fuel can be shortened and convenience can be provided to a driver, and third, through easy removal/mounting of the side skirt, convenience can be provided in maintenance of peripheral parts of the frame.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A side skirt mounting apparatus of a side skirt for a truck installed on a side of a body frame to protect a tank assembly,
   wherein the side skirt is installed to be supported by a one-touch locker in an upper portion thereof and a hinge in a lower portion thereof, wherein the locker includes:
   an upper bracket;
   a lower bracket;
   a skirt frame to which the upper bracket and the lower bracket are engaged;
   a shaft installed to slidably penetrate the upper and lower brackets and to be selectively inserted into a hole formed to a side skirt bracket; and
   an elastic member mounted on an outer circumference of the shaft between the upper and lower brackets to elastically support the shaft; and
   wherein the side skirt is removed from or mounted to the side skirt bracket by rotation around the hinge disposed at the lower portion of the side skirt after an upper portion of the side skirt is released from or engaged to the side skirt bracket by a vertical movement of the shaft;
   wherein, in a body of the shaft, the shaft includes:
   a stopper in a shape of a circular plate which has a flat portion configured to guide a straight motion of the shaft; and
   a stop ring in the shape of a ring;
   wherein the stopper and the stop ring are concentrically formed up and down of the shaft with a predetermined interval therebetween; and
   wherein the stopper is selectively supported on a top surface of the upper bracket and the stop ring is selectively supported on a top surface of the lower bracket.

2. The side skirt mounting apparatus of claim 1, wherein the locker further includes the stopper formed at the shaft above the upper bracket and stopped downwardly on a stopper bar formed on the upper bracket when the stopper is engaged with the stopper bar.

3. The side skirt mounting apparatus of claim 1, wherein the stopper is engaged with the stopper bar and the shaft is disengaged from the hole of the side skirt bracket when the stopper is rotated with a predetermined angle such that the flat portion of the stopper is aligned not in parallel to the stopper bar.

4. The side skirt mounting apparatus of claim 1, wherein the stopper is disengaged with the stopper bar and the shaft is engaged to the hole of the side skirt bracket when the stopper is rotated with a predetermined angle such that the flat portion of the stopper is aligned in parallel to the stopper bar.

5. The side skirt mounting apparatus of claim 1, wherein the stop ring is formed on the shaft between the upper bracket and the lower bracket.

6. The side skirt mounting apparatus of claim 5, wherein an upper portion of the elastic member is supported on a bottom surface of the upper bracket and a lower portion of the elastic member is supported on a top surface of the stop ring on the shaft, such that the shaft is elastically biased downwardly.

7. The side skirt mounting apparatus of claim 1, wherein the hinge is an open-type hinge which uses a lock structure between a groove in the skirt frame and a pin in the side skirt bracket.

8. The side skirt mounting apparatus of claim 1, wherein the hinge is a close-type hinge which uses an engagement structure between a pin hole in the skirt frame and a pin in the side skirt bracket.

\* \* \* \* \*